United States Patent [19]

Antonazzi, Sr. et al.

[11] Patent Number: 4,724,709
[45] Date of Patent: Feb. 16, 1988

[54] PRESSURE MEASURING SYSTEM WITH INTERNAL REFERENCE

[75] Inventors: Frank J. Antonazzi, Sr., South Bend; Michael C. Janosik, Mishawaka, both of Ind.

[73] Assignee: Allied Corporation, Morristown, N.J.

[21] Appl. No.: 812,700

[22] Filed: Dec. 23, 1985

[51] Int. Cl.⁴ .................................................. G01L 9/12
[52] U.S. Cl. .................................... 73/701; 73/718; 73/724; 324/61 R
[58] Field of Search ............... 73/701, 708, 718, 724, 73/862.61, 517 B; 307/308; 328/173, 175; 361/283; 324/60 C, 61 R; 346/31, 32

[56] References Cited

U.S. PATENT DOCUMENTS 4,449,409  5/1984  Antonazzi .......................... 73/724

Primary Examiner—Donald O. Woodiel
Attorney, Agent, or Firm—Ken C. Decker

[57] ABSTRACT

A pressure measuring system which includes a pressure sensitive capacitor and a reference capacitor, a source of external excitation connected to the sensing capacitor, the reference capacitor being connected to a feedback signal generating circuit and the output from said capacitors being summed by a summing junction to produce an error signal. A phase sensitive demodulator is connected to receive the error signal and input same to a feedback signal generating circuit to generate the feedback signal for the reference capacitor. The feedback signal generating circuit includes a computing circuit for generating a digital signal corresponding to the magnitude of said feedback signal required to null said sensing capacitor signal to thereby provide a measurement of pressure. The system is characterized in that an excitation source for the systems phase sensitive demodulator is internally mounted closely proximate the sensing capacitor and the reference signal for the phase sensitive demodulator is derived directly from the input signal to the sensing capacitor to thereby obviate phase shift errors in the excitation thereof.

4 Claims, 3 Drawing Figures

PRESSURE MEASURING SYSTEM WITH INTERNAL REFERENCE

BACKGROUND OF THE INVENTION

The present invention relates to a pressure measurement system and, in particular, to a pressure measurement system which incorporates sensing and reference capacitor networks energized by an external source and a feedback loop to generate oppositely-phased signals which are summed to produce an error signal representative of the difference therebetween. The error signal is demodulated and digitally processed through the feedback loop to null the error signal and generate a digital signal representative of pressure.

Pressure measuring systems incorporating this basic configuration are disclosed in U.S. Pat. No. 4,322,977 entitled, "Pressure Measuring System" to Robert C. Sell, John R. Sheler and John M. Juhasz, and U.S. Pat. No. 4,449,409, to Frank J. Antonazzi, and other patents referenced therein. These patents are assigned to the assignee of this invention. Characteristically, this general type of pressure measuring system is rugged and provides for pressure measurement to a high degree of accuracy. Such systems find broad application in such rigorous environments as fuel control systems for gas turbine engines. In such applications, it is common for the pressure sensors, a central processing unit, power supplies and the like to be located in various parts of an aircraft. From the above-referenced United States patents it will further be seen that these systems incorporate a phase sensitive demodulator to receive, demodulate and amplify the error signal subsequently used to generate a nulling signal and provide a digital indication of pressure. Because the demodulator is phase sensitive, any phase shift between the error signal and the excitation source utilized for the phase sensitive demodulator resulting from variations in wiring from system to system can cause variation in the pressure measurement and careful matching of units becomes necessary when units are interchanged. Accordingly, it is desirable to provide a pressure measuring system in which this problem is eliminated.

Broadly, the present invention is a pressure measuring system which includes at least one pressure sensitive capacitor and a reference capacitor. The pressure sensitive capacitor is connected to a source of excitation voltage and the reference capacitor is excited by an oppositely phased signal from a feedback loop. The output signals from the two capacitors are summed to produce an error signal which is demodulated by a phase sensitive demodulator to generate a signal which is applied to a digital computing circuit to generate the feedback signal applied to the reference capacitor. Simultaneously, the digital circuit generates a digital number or value corresponding to the feedback signal required to null the capacitance circuit and, correspondingly, a signal which corresponds to pressure. The circuit is characterized in that it includes a phase sensitive demodulator reference voltage source which generates a source signal for the phase sensitive demodulator precisely in phase with the capacitor excitation signal. The phase sensitive demodulator excitation source is located adjacent to the phase sensitive demodulator. This reduces wire requirements between the central processor and transducer module. This in turn assures phase coherence and interchangeability of the pressure transducer modules without special matching.

It is therefore an object of the invention to provide an improved pressure measurement system.

It is another object of the invention to provide such a system in which the effect of a phaser difference in the excitation signals for the pressure sensing capacitor(s) and phase sensitive demodulator is eliminated.

Still another object of the invention is to provide a phase shift demodulator circuit for use in a pressure measurement system wherein the excitation signal for the phase sensitive demodulator is derived directly from the input to the pressure sensing capacitor.

These and other objects of the invention will be best understood in reference to the following description taken in conjunction with the attached drawings wherein.

DESCRIPTION OF THE PREFERRED EMBODIMENT

Figure 1:
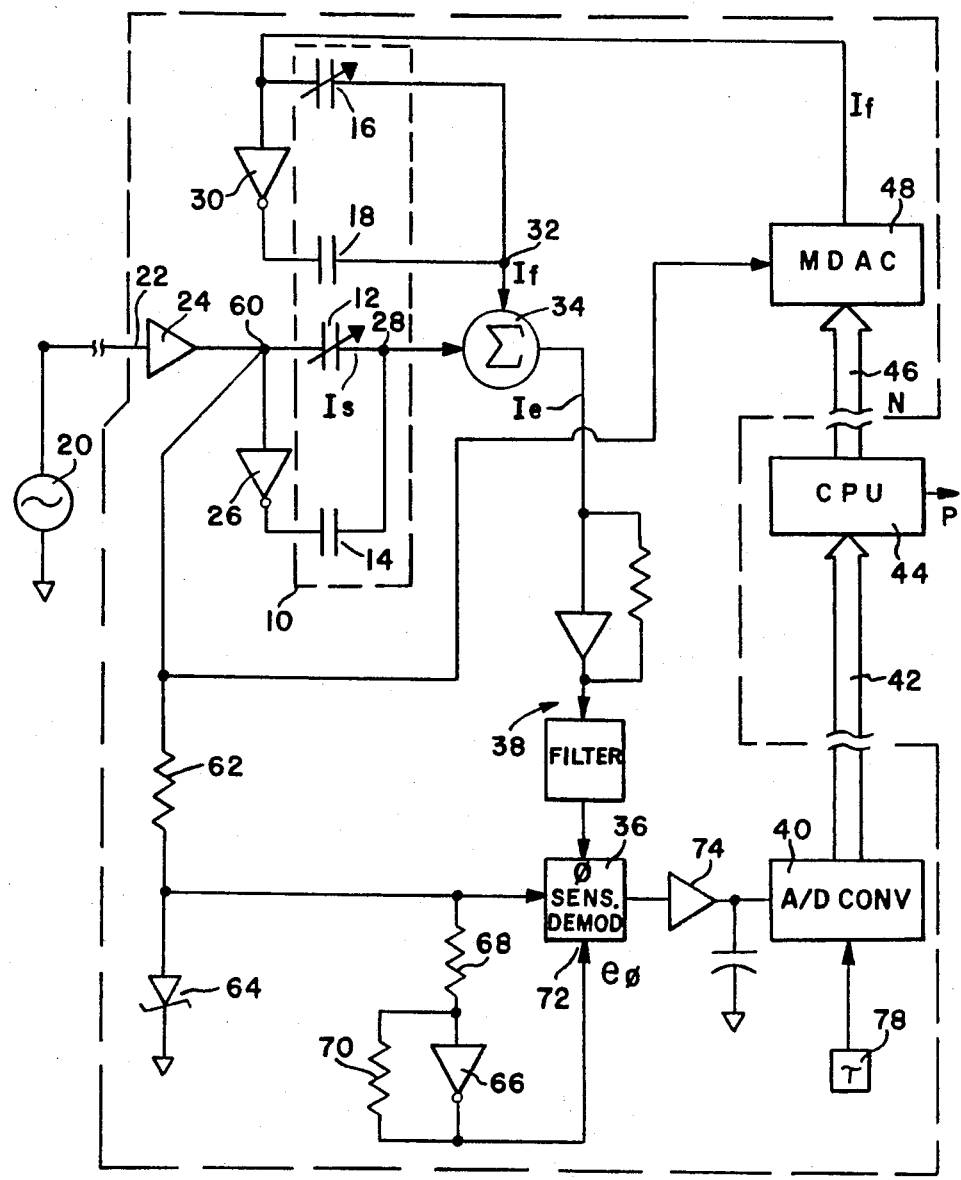
FIG. 1 is a circuit block diagram of a pressure measurement system incorporating the present invention.

Referring now to FIG. 1, there is shown a pressure measuring system which includes, in the illustrated embodiment, a network of four capacitors 10. The invention is, however, equally applicable to other capacitor configurations and the four capacitor network is presented here only by way of example. This network of capacitors includes a primary sensing capacitor 12 associated with a substantially invariable reference capacitor 14, a feedback capacitor 16, and a substantially invariable feedback reference capacitor 18. An external source of excitation 20 applies an alternating current excitation via a conductor 22 to a buffer amplifier 24. The output from the buffer amplifier 24 is applied directly to capacitor 12 and is simultaneously converted by inverter 26 and applied to one terminal of the capacitor 14. The output from capacitors 12 and 14 at terminal 28 will be an alternating current signal $i_s$ that is a function of the difference between the values of the sense capacitor 12 and reference capacitor 14.

Simultaneously, a feedback excitation signal of variable magnitude is applied to a feedback capacitor 16 and through an inverter 30 to a feedback reference capacitor 18 to generate a second output current $i_f$ at terminal 32 determined by the difference in value between capacitors 16 and 18 and the magnitude of the feedback excitation. The signals appearing at terminals 28, 32 are applied to a summing junction 34, the output of which is a signal equal to the difference between the signals $i_s$ and $i_f$ at terminals 28, 32.

In a manner more fully described in U.S. Pat. No. 4,449,409, and other patents referenced therein this signal is fed through a phase sensitive demodulator 36 to produce the error signal $i_e$. This signal $i_e$ is then passed via amplifier and filter circuit 38, an analog to digital converter 40, and a multi-conductor bus 42, to a central processing unit or computer 44. The computer 44 in turn generates a digital output signal denominated N which is an accumulative value that is a function of the magnitude of the feedback signal required to null the signal from capacitors 12, 14. This value is passed, again by a multiconductor bus 46, to a multiplying digital to analogue converter 48 which outputs the analog feedback signal $i_f$ utilized as excitation for the capacitors 16, 18. From the above-referenced patents, it will be recognized that the feedback signal is incremented to generate a feedback signal of magnitude to precisely null the output from the summing junction 34. The circuit effectively functions as a capacitance bridge to provide a digital output from the computer 44 based representative of the pressure being applied to the sense capacitor 12.

In the illustrated embodiment, the capacitors 12, 14, 16 and 18 are incorporated in a single quartz capsule having exceptional stability and repeatability. While the capsule has been illustrated as containing four capacitors, the circuit can be produced utilizing two, three, or four capacitors, again, as explained more fully in the above-referenced United States patents.

Figure 3:
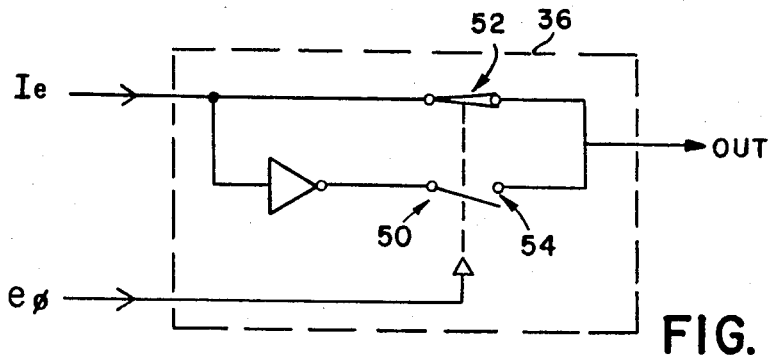
FIG. 3 is a simplified schematic diagram of the phase sensitive demodulator.
Figure 2:
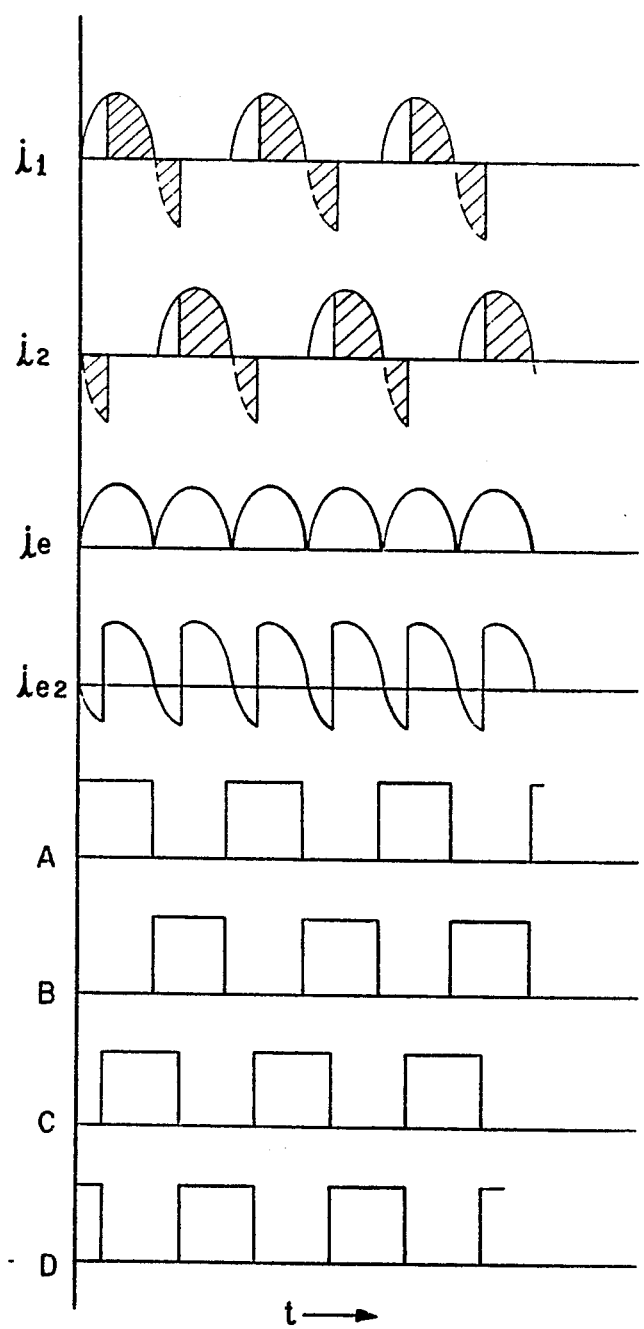
FIG. 2 is a chart showing the phase relationship of various signals in the circuit and useful in explaining the invention.

With reference now to FIGS. 2 and 3, the operation of the phase sensitive demodulator 36 is explained in more detail. The phase sensitive demodulator, as best seen in FIG. 3, is essentially a two pole switch 50 in which the poles are alternately opened and closed in response to an external excitation signal herein excitation $e_\phi$ as indicated at A and B in FIG. 2. The summed signal from junction signal 34 is applied directly to one of the switch poles 52 and simultaneously is passed through an inverter to the other of the poles 54. The resultant output signals passed by each of the poles 52, 54, are illustrated as $i_1$ and $i_2$ in FIG. 2. These signals are then summed to produce the output signal $i_e$ as shown. This summation result occurs when the excitation source $e_\phi$ is precisely in phase with the error signal $i_e$ as shown in FIG. 2. If, however, there is a difference in the phase between the excitation voltage $e_\phi$ and the signals from junction 34, the switch polls 52, 54, will be conductive as indicated at C and D in FIG. 2. These conductive states will coincide with signals $i_1$ and $i_2$ as indicated by the shaded areas in charts $i_1$ and $i_2$ producing the output signal denominated $ie_2$ in FIG. 2. It will now be apparent that even a small amount of phase shift between the error signal and demodulator excitation signal will produce a significant variation in the magnitude of the error signal. Since this error signal is, in turn, utilized to generate the feedback signal, $i_f$ and as the basis for measurement of pressure, any phase error will produce a corresponding error in the pressure measurement. It will now be seen that providing precise phase coherence between the excitation signal $e_\phi$ and the excitation signal for capacitors 12, 14 is necessary for high precision pressure measurement. In accordance with the present invention, the excitation signal for the phase sensitive demodulator 36 is generated internally on the circuit board containing the pressure capsule 10. This provides an internal reference signal for the phase sensitive demodulator precisely in phase with the capacitor excitation signal. Any remaining phase differential is corrected during calibration of the units. This assures transducer module interchangeability and eliminates the external excitation source 20 formerly used for this purpose.

The phase sensitive demodulator excitation signal is generated by tapping the capacitor excitation signal at the point of application thereof to the pressure capsule at terminal 60. The signal is passed through a load resistor and voltage regulating zener diode network 62, 64. The output from this circuit is applied directly to the phase sensitive demodulator 36 and simultaneously passed through a buffer amplifier 66 appropriately configured by resistors 68 and 70 to provide an oppositely phased reference phase demodulator signal applied to input terminal 72. The output from the phase sensitive demodulator 36 is amplified and filtered by circuit 74 and passed to the analog to digital converter 40 as described in the above-referenced United States patents. Typically, the circuit will further include a temperature compensation device 78, the output of which is also multiplexed to an external remotely located central processing unit 44.

By providing a phase demodulator excitation source located internally on the circuit board adjacent the sensing capacitors, phase variation caused by intermodule wiring is eliminated and interchangeability of modules is assured.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What I claim is:

1. A pressure measuring system which includes a pressure sensor capacitor means connected to a remotely located source of excitation for generating a pressure signal variable as a function of pressure thereon, a capacitor reference means connected to a feedback signal generating means for generating a nulling signal of phase opposite the phase of said pressure signal and variable as a function of a feedback signal applied thereto, summing means connected to receive said pressure signal and said nulling signal for generating an error signal as a function of the difference therebetween, and feedback signal generating means connected to receive said error signal for generating a feedback signal effective to null said error signal and simultaneously output a measurement signal representative of the magnitude of said feedback signal, and thereby, of said pressure, characterized in that said error signal generating means includes a phase sensitive demodulator and a phase sensitive demodulator reference signal generator connected to the input of said pressure sensor capacitor means, said phase sensitive demodulator being connected and responsive thereto to generate said error signal, said sensor capacitor means, said capacitor reference means, and said phase sensitive demodulator being mounted closely proximate on a single circuit board, said phase sensitive demodulator including an inverter circuit connected to one input thereof for generating a second phase sensitive demodulator signal 180° out of phase with said phase sensitive demodulator reference signal.

2. The system of claim 1 wherein said phase sensitive demodulator includes a pair of gates, means for rendering said gates alternately conductive, one of said gates being connected to receive said error signal, the other of said gates being connected to receive said error signal inverted.

3. The system of claim 2 wherein said gates are opposite poles of a two pole switching device.

4. The system of claim 1 wherein said phase sensitive demodulator reference signal generator includes a voltage regulating input circuit including a series connected resistor and zener diode.

* * * * *